(12) United States Patent
Bangalore et al.

(10) Patent No.: US 8,014,322 B2
(45) Date of Patent: Sep. 6, 2011

(54) DIAGNOSTIC TOOL FOR TROUBLESHOOTING MULTIMEDIA STREAMING APPLICATIONS

(75) Inventors: Manjunath S. Bangalore, Sunnyvale, CA (US); Randall B. Baird, Austin, TX (US)

(73) Assignee: Cisco, Technology, Inc., San Jose, CA (US)

( * ) Notice: Subject to any disclaimer, the term of this patent is extended or adjusted under 35 U.S.C. 154(b) by 1077 days.

(21) Appl. No.: 11/711,448

(22) Filed: Feb. 26, 2007

(65) Prior Publication Data

US 2008/0205390 A1 Aug. 28, 2008

(51) Int. Cl.
*H04L 12/26* (2006.01)
*H04L 1/00* (2006.01)
*H04L 12/16* (2006.01)
*H04L 12/28* (2006.01)
*H04W 4/00* (2009.01)
*G06F 15/173* (2006.01)

(52) U.S. Cl. ........ 370/265; 370/241; 370/260; 370/261; 370/266; 370/328; 709/223; 709/224

(58) Field of Classification Search .................. 370/389, 370/351; 709/221, 223
See application file for complete search history.

(56) References Cited

U.S. PATENT DOCUMENTS

| | | | |
|---|---|---|---|
| 6,044,081 A | | 3/2000 | Bell et al. |
| 6,452,915 B1 * | | 9/2002 | Jorgensen .................... 370/338 |
| 6,771,644 B1 | | 8/2004 | Brassil et al. |
| 6,801,530 B1 * | | 10/2004 | Brandt et al. ................ 370/392 |
| 6,947,417 B2 | | 9/2005 | Laursen et al. |
| 7,411,903 B2 * | | 8/2008 | Jang et al. .................... 370/230 |
| 7,680,920 B2 * | | 3/2010 | Selvaggi et al. .............. 709/224 |
| 7,734,762 B2 * | | 6/2010 | Hundscheidt et al. ........ 709/224 |
| 2002/0014282 A1 | | 2/2002 | Andersson et al. |
| 2002/0099854 A1 * | | 7/2002 | Jorgensen .................... 709/249 |
| 2003/0076850 A1 | | 4/2003 | Jason, Jr. |
| 2004/0027991 A1 * | | 2/2004 | Jang et al. .................... 370/230 |
| 2004/0073641 A1 * | | 4/2004 | Minhazuddin et al. ....... 709/223 |
| 2004/0073690 A1 * | | 4/2004 | Hepworth et al. ............ 709/230 |
| 2004/0076277 A1 * | | 4/2004 | Kuusinen et al. ........ 379/202.01 |

(Continued)

FOREIGN PATENT DOCUMENTS

EP 1 553 735 A1 7/2005

OTHER PUBLICATIONS

Schulzrinne et al., RFC 1889, RFC, Jan. 1996.*

*Primary Examiner* — Marsha D Banks Harold
*Assistant Examiner* — Christopher T Wyllie
(74) *Attorney, Agent, or Firm* — The Law Offices of Bradley J. Bereznak

(57) ABSTRACT

In one embodiment, a method includes correlating, for each intermediate device associated with a Real-time Transport Protocol (RTP) application that connects endpoints through a plurality of intermediate devices across a network, one or more first RTP segments input into the intermediate device with one or more second RTP segments output from the intermediate device. The correlation results are then graphically displayed results of the correlating to obtain a full, end-to-end picture of RTP quality from a source endpoint to a destination endpoint of the RTP application. It is emphasized that this abstract is provided to comply with the rules requiring an abstract that will allow a searcher or other reader to quickly ascertain the subject matter of the technical disclosure.

14 Claims, 3 Drawing Sheets

U.S. PATENT DOCUMENTS

| | | | |
|---|---|---|---|
| 2004/0078811 A1* | 4/2004 | Urdang | 725/44 |
| 2004/0193709 A1* | 9/2004 | Selvaggi et al. | 709/224 |
| 2004/0213152 A1 | 10/2004 | Matuoka et al. | |
| 2005/0097193 A1* | 5/2005 | Rhoda et al. | 709/220 |
| 2005/0219151 A1* | 10/2005 | Li et al. | 345/7 |
| 2006/0069799 A1* | 3/2006 | Hundscheidt et al. | 709/232 |
| 2006/0080662 A1* | 4/2006 | Mysore et al. | 718/100 |
| 2007/0286175 A1* | 12/2007 | Xu et al. | 370/356 |
| 2008/0056302 A1* | 3/2008 | Erdal et al. | 370/474 |
| 2008/0205390 A1* | 8/2008 | Bangalore et al. | 370/389 |
| 2009/0086645 A1* | 4/2009 | Hedayat et al. | 370/250 |
| 2009/0147787 A1* | 6/2009 | Arulambalam et al. | 370/392 |
| 2009/0271512 A1* | 10/2009 | Jorgensen | 709/224 |
| 2009/0327510 A1* | 12/2009 | Edelman et al. | 709/231 |

* cited by examiner

US 8,014,322 B2

DIAGNOSTIC TOOL FOR TROUBLESHOOTING MULTIMEDIA STREAMING APPLICATIONS

FIELD OF THE INVENTION

The present disclosure relates generally to the field of transmission of audio/video data packets over a network.

BACKGROUND OF THE INVENTION

Multimedia streaming applications using the Real-time Transport Protocol (RTP) are notoriously difficult to troubleshoot. The stringent Quality of Service (QoS) requirements associated with most RTP applications can lead to an assortment of problems, including dropped packets, excessive delay, inter-packet jitter, etc. Furthermore, some RTP applications stream packets from multiple sources to multiple destinations, often using Internet Protocol (IP) multicast technology. A variety of different media formats may contribute to the scope of a single RTP session. For example, a video conference may include endpoint devices operating in accordance with different media formats (e.g., H.261, H.264, MPEG2, etc.) and mixed into a single composite video image.

While many analysis tools exist to help troubleshoot single RTP flows, troubleshooting is greatly complicated when an RTP stream having one type of media format flows into a device, such as a mixer or translator, and is translated or transformed to emerge as a completely different RTP stream. By way of example, the logical flow of a video stream may be from a source video endpoint to a video switch, to a transcoder, to a compositor that mixes multiple video streams from different sources in order to produce a composite output video stream that is then sent to the various destination endpoints. Likewise, a Session Border Controller (SBC) may control and transform RTP and RTCP flows associated with voice, video, or multimedia session content across network borders. An administrator attempting to analyze transmission problems on the network generally must be able to analyze both the input and output streams to the mixer or translator device, and also recognize that they are related to one another. The difficulty, however, with troubleshooting multi-mixer, multi-translator RTP systems is that the mixer or translator device normally obliterates the original stream characteristics. The network administrator, therefore, is often unable to back-trace to the source of the problem.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION

In the following description specific details are set forth, such as protocols, configurations, methods, etc., in order to provide a thorough understanding of the present invention. However, persons having ordinary skill in the relevant arts will appreciate that these specific details may not be needed to practice the embodiments described.

In the context of the present disclosure, an endpoint is any device, component, element, or object capable of initiating or participating in audio/video packet-data exchanges over a network. An endpoint may comprise a personal computer (PC), video IP phone, personal digital assistant (PDA), laptop or notebook computer, or other audio or video conferencing equipment.

A mixer is an intermediate device or system that receives a sequence of RTP packets, often called a session or a stream, from one or more sources, possibly changes the data format, combines the packets in some manner and then forwards a new RTP packet. Data packets originating from a mixer, for instance, are identified as having a synchronization source (SSRC), RTP sequence number, and timestamp allocated and maintained by the mixer. Mixers may include the SSRC fields of contributing RTP sessions in the contributing source field (CSRC) of the outgoing RTP session.

A translator is an intermediate device or system that forwards RTP packets with their SSRC intact. A translator may thus comprise a node or network element that provides a translation function between different transmission formats and communication procedures. Examples of translators include devices that convert encodings without mixing (e.g., transcoders), replicators from multicast to unicast, and application-level filters in firewalls. In addition, a translator may support communications between endpoints and video terminals operating in accordance with different protocols.

A computer network, in the context of this disclosure, is a geographically distributed collection of interconnected sub-networks for transporting data between nodes, such as intermediate nodes and end nodes (also referred to as endpoints). A local area network (LAN) is an example of such a subnetwork; a plurality of LANs may be further interconnected by an intermediate network node, such as a router, bridge, or switch, to extend the effective "size" of the computer network and increase the number of communicating nodes. Examples of the devices or nodes include servers, mixers, translators, control units, and personal computers. The nodes typically communicate by exchanging discrete frames or packets of data according to predefined protocols.

Figure 4:
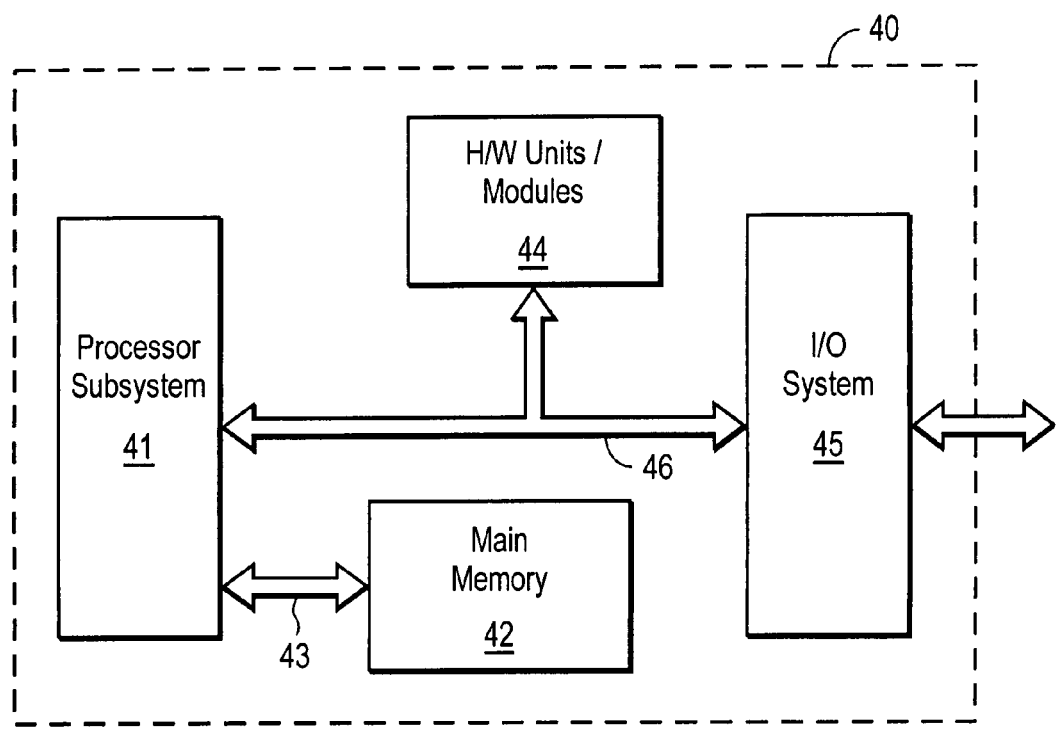
FIG. 4 illustrates basic components of an example node or network device.

FIG. 4 illustrates basic components of an example node or network device 40, which typically comprises a number of basic subsystems that includes a processor subsystem 41, a main memory 42 and an input/output (I/O) subsystem 45. Data is transferred between main memory ("system memory") 42 and processor subsystem 41 over a memory bus 43, and between the processor and I/O subsystems over a system bus 46. Examples of the system bus may include the conventional lightning data transport (or hyper transport) bus and the conventional peripheral component interconnect (PCI) bus. Device 40 may also comprise other hardware units/modules 44 coupled to system bus 46 for performing additional functions consistent with the methods and operations described herein. Processor subsystem 41 may comprise one or more processors and a controller device that incorporates a set of functions including a system memory controller, support for one or more system buses and direct memory access (DMA) engines.

According to one embodiment, a multi-segment RTP analysis tool or diagnostic framework is provided that allows coherent collection of RTP statistics associated with a particular stream in order to facilitate rapid and easy troubleshooting of RTP applications utilizing mixers and translators.

This tool correlates multiple different RTP streams (i.e., RTP streams with different SSRC fields) so as to present a unified picture of the flow all the way from sources to destinations in a multi-hop environment, i.e., multiple RTP application layer (i.e., Layer 7) segments or hops between devices that include endpoints, mixers, and translators.

In a specific embodiment, a method is provided to take multiple different RTP streams and correlate them based on the distinction between "upstream" RTP segments that input into an intermediate device such as a mixer or translator, versus "downstream" RTP segments that are output from the intermediate devices. An application (e.g., a graphical user interface (GUI)) then takes the results of these correlations and displays them so that a user or administrator can obtain a visual, full end-to-end picture of RTP quality from a source endpoint, through one or more mixers, translators, through SBC boundaries, etc., and ultimately to a given destination endpoint. By presenting the correlations in a graphical manner, the administrator may quickly diagnose problems in a network (e.g., voice quality) across multiple RTP hops.

Figure 1:
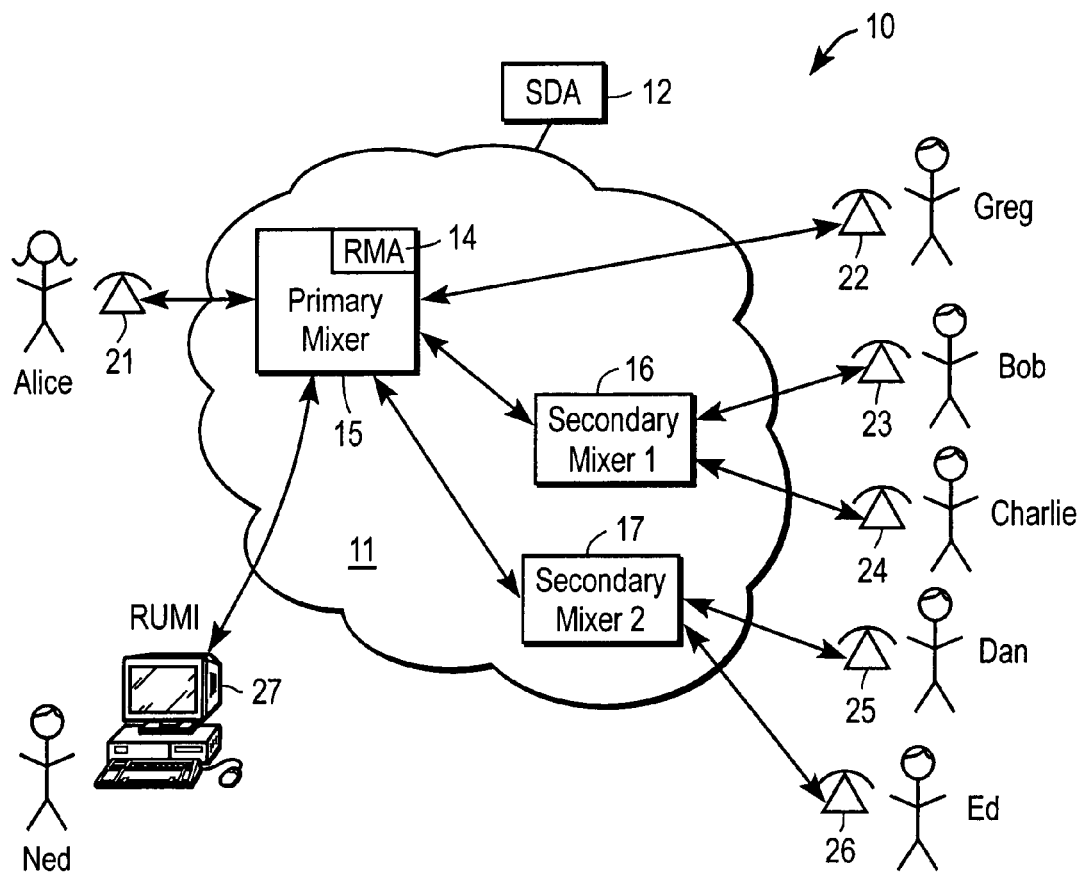
FIG. 1 illustrates an example RTP conferencing application running on a communications network.

With reference now to FIG. 1, an example RTP audio conferencing application running on a communications network 10 is shown comprising audio endpoints (e.g., IP phones) 21-26 connected over a network 11 that includes a primary mixer 15 which hosts the conference session, and secondary mixers 16 & 17 that connect to various endpoint devices. The various individuals participating in the conference session (i.e., Alice, Bob, Charlie, Dan, Ed and Greg) are shown connected with one of the mixers 15-17 via their respective endpoints 21-26. For instance, Alice and Greg are connected to primary mixer 15 via endpoints 21 and 22, respectively. Bob and Charlie participate via respective endpoints 23 and 24, which are connected to secondary mixer 16, which, in turn, connects with primary mixer 15. Similarly, Dan and Ed participate in the audio conference session via endpoints 25 and 26, respectively, which connect with primary mixer 15 through secondary mixer 17.

In the example of FIG. 1, a network administrator, Ned, associated with a node 27 (e.g., a PC) runs a RTP Management User Interface (RMUI) application that is shown gathering call information from the Stream Discovery Agent (SDA) associated with network 11. A SDA 12 is shown as a separate physical box or unit connected to network 11. In one embodiment, the SDA comprises a logical entity that resides on or is associated with zero or more nodes in a signaling path between source nodes (endpoints) and destination nodes (endpoints).

In FIG. 1, for example, there may be separate SDAs associated with each of mixers 15-17. These SDAs are collectively represented by the box depicted as SDA 12. SDA 12 is operable to return the characteristics of a given RTP flow, which may include information such as source and destination IP addresses and port numbers (sometimes referred to collectively as a flow), the SSRC value, and the canonical name (CNAME) associated with the RTP session, which may be a record in the Domain Name Service (DNS) database that indicates the true or canonical host name of a computer or node with which its aliases are associated. (As is well known, a computer hosting a web site must have an IP address in order to be connected to the Internet. The DNS resolves the computer's domain name to its IP address, but sometimes more than one domain name resolves to the same IP address.)

The SDA is operable to convert call-based addresses to stream-based addresses. This information is generated for use by the other components (e.g., the RMUI) in the architecture. By way of example, the SDA associated with primary mixer 15 may receive a request from the RMUI running on PC 27 to locate a set of RTP streams/segments that represents, say, a call between Alice and Bob, or the mixed, streaming audio conference with ID number 01236. In response, the SDA takes the signaling level information associated with the specific request and converts it to stream-level information comprising information such as flow for the RTP session, SSRC, CNAME, etc.

The example of FIG. 1 also includes a RTP Management Agent (RMA) 14 that resides on or is associated with primary mixer 15. In one embodiment, the RMA is a logical entity that may reside on or is associated with zero or more RTP sources, destinations, mixers, or translators associated with a given RTP application. Although not explicitly shown in the example of FIG. 1, an RMA may reside on each of mixers 16-17, as well as each of endpoints 21-26. When presented with an RTP "address" (i.e., the information retrieved from the SDA), the RMA can be queried for Management Information Base (MIB) information.

A MIB is a database of objects that can be monitored, for example, by a network management system. In the context of the embodiments shown, the MIB information may comprise all sender and receiver statistics gathered for the RTP stream being addressed in the RMA. These statistics include the flowspec (i.e., source and destination IP sockets), associated RTCP-based statistics, plus any additional statistics that might be relevant to the node on which the RMA is hosted. For example, there may be codec-based or mixer-based statistics that are relevant for troubleshooting. In addition to instantaneous statistics, the MIB may also contain some statistical history, allowing the administrator (Ned) to see the evolution of a recent RTP problem over time.

On RTP mixer and translator nodes, the MIB information returned by the RMA includes a list of all streams that have recently contributed to the construction of the requested RTP stream. Note that the RMA retains history of the upstream RTP sessions contributing to the RTP session being requested of the RMA, even if the contributing source (CSRC) field in the outgoing RTP packet headers is not being populated. The CSRC is a source of a stream of RTP packets that has contributed to a combined stream produced by an RTP mixer. The mixer may insert a list (the CSRC list) of the SSRC identifiers of the sources that contributed to the generation of a particular packet into the RTP header of that packet. In FIG. 1, for example, RMA 14 retains the contributing source information for all streams/packets mixed by mixer 15 even though all of the audio packets in the mixed output stream contain the same SSRC identifier (that of mixer 15). All receiver statistics for each of the contributing streams is also retained and returned by the RMA.

The RMUI may comprise a coded program that is executed by the processor subsystem of a node (e.g., PC 27) associated with a network administrator. For example, the RMUI provides a GUI on PC 27 that allows the administrator, Ned, to browse various RTP flows when looking for problems. The RMUI may be either a web-based or a native GUI application. In one embodiment, the GUI may be generated by software (i.e., code) running on PC 27. In other cases, the GUI may comprise a collaborative web-based application that is accessed by the browser software running on the administrator's PC. For instance, the GUI of the RMUI may comprise an application running on a server, with the GUI being accessed by PC 27 via network 11. In other instances, the RTP management GUI may comprise a downloaded application, or other forms of computer-executable code that may be loaded or accessed by PC 27.

Figure 2:
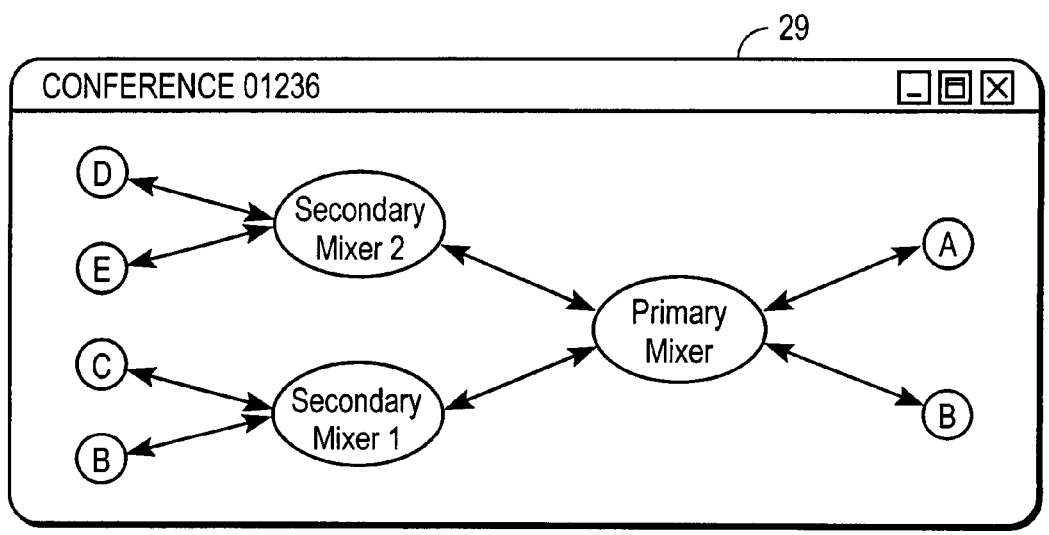
FIG. 2 illustrates an example window of a graphical user interface depicting the RTP flows shown in FIG. 1.

FIG. 2 illustrates an example window 29 of a GUI generated by the RMUI of PC 27 depicting the RTP flows shown in FIG. 1. (Note that the encircled letters "A" through "E" respectively represent the endpoints correspondingly associated with Alice through Ed, shown in FIG. 1.) As can be seen, each RTP segment between the primary and secondary mixers is shown, as well as the direct connections between each of the endpoints and a secondary or the primary mixer. Using the GUI shown in FIG. 2, the network administrator may select or click on any of the RTP segments, or on any of the devices shown, to display relevant information from its associated RMA and SDA (e.g., statistics for each contributor to the flow) useful in diagnosing a reported problem. By way of example, Ned, the network administrator may click on the primary mixer and find that there is no problem with its operation, but in looking at the SSRCs Ned may discover that Dan is cascaded through a secondary mixer that is experiencing high packet loss. In this manner, Ned may determine the source of reported audio problems for an on-going conference session.

Figure 3:
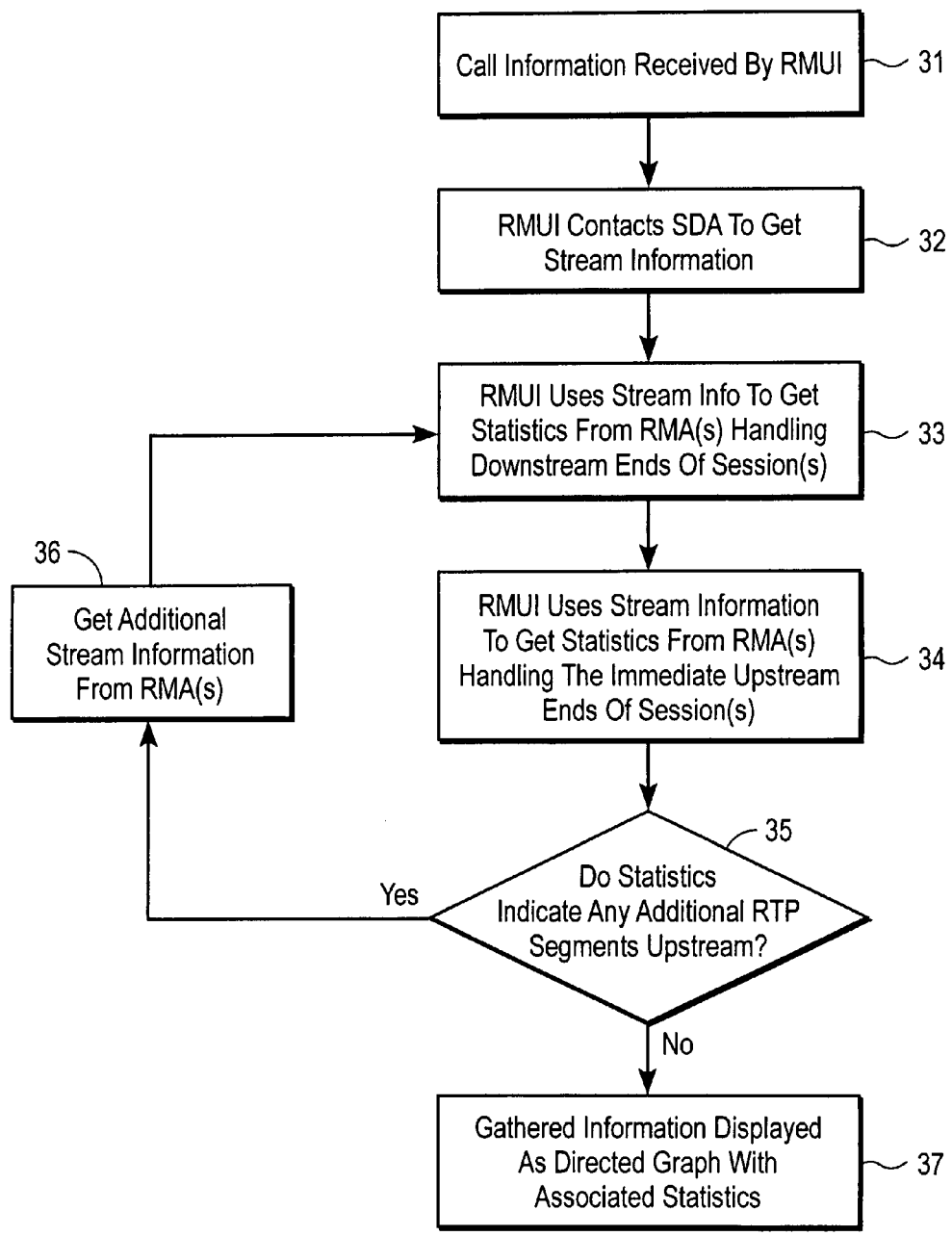
FIG. 3 illustrates an example method for diagnosing a voice quality problem in the conference shown in FIG. 1.

FIG. 3 illustrates an example method for diagnosing a voice quality problem in the conference shown in FIG. 1. The process begins at block 31 with the RMUI receiving information for a reported audio problem from one or more conference endpoints (e.g., Alice's endpoint 21) or from some other source, such as a Call Detail Record (CDR). In block 32, the RMUI contacts an SDA capable of resolving the call information on the problem endpoint(s) to a set of RTP stream descriptions. The SDA contacted may be selected, for example, by selecting the "nearest" SDA, an SDA located on the endpoint experiencing the problem, or by otherwise locating an appropriate SDA based on the details of the call or calls experiencing the problem.

The RMUI then begins a loop that works back through the entire set of streams involved with the problem, starting with the receiving endpoint(s) experiencing the problem and ending with the sources. In block 33, the RMUI uses the stream information to locate the RMA(s) responsible for acquiring data about the stream consumers. The RMUI queries each RMA to gather statistics, e.g., MIB information, about how the stream was received. The RMUI then uses the stream information to locate the sources of each stream, which it then uses to query each RMA to gather statistics about how well each stream was sent (block 34).

From the RMAs that monitor the stream sources, the RMUI also can determine whether these sources are, in turn, fed from additional streams that are received on the same devices for which the RMA is responsible (block 35). If there are additional streams (i.e., additional RTP segments upstream), the RMUI gathers the additional stream information (block 36) and then proceeds back to block 33. The entire process in the loop of gathering information from the stream receivers and sources is repeated until all of the relevant streams have been examined.

If the query of block 35 is negative (i.e., there are no additional streams), the RMUI has gathered all possible stream statistics. It then proceeds to block 37, where the statistical information is displayed for the end user.

The RMUI, for example, may first go to the endpoint experiencing a problem to obtain statistics, then go to the primary mixer and obtain statistics from that device, and then to one of the secondary mixers to gather additional statistics. The RMUI may also gather information regarding any contributors to the RTP flow produced from the secondary mixer. From the statistics of each contributor, the RMUI can trace back to multiple RMAs, and so on, gathering statistics for every recent contributor to the flow. Once the information has been obtained for the end-to-end flow, the RMUI may display the gathered information as a directed graph, with each node in the graph corresponding to an RMA with associated statistics. The administrator can then browse this graph in order to determine the source or cause of a media problem for the conference session in progress.

The above methodology may also be used for other embodiments involving diagnostic operations, such as diagnosis of multicast problems, wherein the RMUI may use the SDA to discover all destination RMAs of a multicast stream, then back-chaining. Another embodiment is in real-time monitoring of a particular unicast problem by having the RMUI periodically gather statistics at all RMAs in a particular path and then dynamically displaying current contributors and statistics. In still another embodiment, an RMA map may be produced that shows a complete directed graph of all flows active in a network. The methods and architecture described above may therefore be used to achieve multi-stream correlation in a wide variety of applications. In each case, the analysis tool allows an administrator to look at end-to-end RTP quality by examining any set of related RTP sessions, even when devices like audio mixers and session border controllers are placed between the original source and the ultimate destination.

It should be understood that elements of the present invention may also be provided as a computer program product which may include a "machine-readable medium" having stored thereon instructions which may be used to program a computer (e.g., a processor or other electronic device) to perform a sequence of operations. A machine-readable medium" may include any computer program product, apparatus and/or device (e.g., magnetic discs, optical disks, memory, Programmable Logic Devices (PLDs) used to provide machine instructions and/or data to a programmable processor, including a machine-readable medium that receives machine instructions as a machine-readable signal. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Furthermore, although the present invention has been described with reference to specific exemplary embodiments, it should be understood that numerous changes in the disclosed embodiments can be made in accordance with the disclosure herein without departing from the spirit and scope of the invention. For instance, although the example of FIG. 1 shows the use of mixers for an audio conferencing application, other embodiments, such as a video conferencing application, may include multiple mixers and translators providing connections between the various participants. The preceding description, therefore, is not meant to limit the scope of the invention. Rather, the scope of the invention is to be determined only by the appended claims and their equivalents.

We claim:

1. A system comprising:
 a graphical user interface (GUI) running on or associated with a first node connected to a network which includes an intermediate node in a signaling path that connects a source endpoint with a destination endpoint, the intermediate node comprising a mixer or a translator device;
 a stream discovery agent (SDA) associated with the intermediate node, the SDA being operable to convert call-based addresses to stream-based addresses and to return characteristics of an Real-time Transport Protocol (RTP) flow in the signaling path responsive to a first request from the GUI;

an RTP management agent (RMA) associated with the intermediate node, the RMA being operable to return Management Information Base (MIB) information which comprises statistics associated with a specified RTP stream in the RTP flow in response to a second request from the GUI, the statistics including source and destination Internet Protocol (IP) sockets, and a list of contributing source information for all RTP streams that have contributed to the specified RTP stream; and wherein the GUI is operable to use the MIB information to trace back to one or more additional intermediate nodes in the signaling path to obtain additional statistics associated with the recently contributing RTP streams in the RTP flow, the GUI being further operable to display a graphical image of the signaling path from the source endpoint to the destination endpoint, the GUI further allowing a user of the first node to selectively display the characteristics obtained from the first logical entity and/or the information obtained from the second logical entity, including statistics associated with each of the RTP streams that have contributed to the specified RTP stream.

2. The system of claim 1 wherein the characteristics include at least one synchronization source (SSRC) value, and a canonical name (CNAME) associated with the RTP flow.

3. The system of claim 1 wherein the stream-based addresses include a source IP address and a destination IP address associated with the RTP flow.

4. The system of claim 1 wherein the statistics include instantaneous statistics and historical statistics.

5. The system of claim 1 wherein the system further comprises additional intermediate nodes in the signaling path, the signaling path including multiple RTP Layer 7 segments.

6. A computer-implemented method comprising:
receiving call information for a reported quality of service (QoS) problem from a first participant to a conference session;
receiving Real-time Transport Protocol (RTP) addressing information from a stream discovery agent (SDA) associated with a first intermediate node connected in a signaling path from a source endpoint associated with the first participant to a destination endpoint, the intermediate node comprising a mixer or a translator device, the addressing information including at least one synchronization source (SSRC) value, and a canonical name (CNAME) associated with an RTP flow in the signaling path;
receiving Management Information Base (MIB) information from an RTP management agent (RMA) associated with the first intermediate node, the MIB information including sender statistics gathered for a specified RTP stream/segment of the RTP flow through the first intermediate node, and a list of all streams that have recently contributed to the specified RTP stream/segment;
using the MIB information to gather, on a node-by-node basis, additional statistical information regarding other specified RTP streams/segments from each of a set of additional secondary agents associated with corresponding additional intermediate nodes connected in the signaling path; and
correlating the statistics and the additional statistical information for the RTP flow along the signaling path from the source endpoint to the destination endpoint; and
displaying the correlated information as a directed graph that includes the first intermediate node and the additional intermediate nodes along with the statistics associated with the first node and the additional statistical information associated with the corresponding additional intermediate nodes.

7. The computer-implemented method of claim 6 wherein the additional intermediate nodes each comprise either a mixer or a translator device.

8. The computer-implemented method of claim 6 wherein one of the additional intermediate nodes comprises a session border controller.

9. A non-transitory computer readable medium encoded with a computer program, which, when executed, is operable to:
receive characteristics of an Real-time Transport Protocol (RTP) flow in a signaling path responsive to a first request to a stream discovery agent (SDA) associated with an intermediate node, the signaling path including one or more mixers and/or translators;
receive Management Information Base (MIB) information from an RTP management agent (RMA) associated with the intermediate node which comprises statistics associated with a specified RTP stream in the RTP flow responsive to a second request, the statistics including source and destination Internet Protocol (IP) sockets, and a list of contributing source information for all RTP streams that have contributed to the specified RTP stream;
using the MIB information, trace back to one or more of additional intermediate nodes in the signaling path to obtain additional statistics associated with the recently contributing RTP streams in the RTP flow;
display an image of the signaling path from the source endpoint to the destination endpoint, and, responsive to input received, selectively display the characteristics and/or information associated with the specified RTP stream, or statistics associated with any of the RTP streams that have contributed to the specified RTP stream.

10. The non-transitory computer readable medium of claim 9 wherein the characteristics include at least one synchronization source (SSRC) value, and a canonical name (CNAME) associated with the RTP flow.

11. The non-transitory computer readable medium of claim 9 wherein the signaling path includes multiple RTP Layer 7 segments.

12. The non-transitory computer readable medium of claim 9 wherein the statistics include instantaneous statistics and historical statistics.

13. An apparatus comprising:
a node for connection to a network which includes a plurality of intermediate nodes which comprise one or more mixers and/or translators in a signaling path that connects a source endpoint with a destination endpoint, the signaling path includes one or more mixers and/or translators, the node including:
one or more processors; and
a memory comprising one or more instructions executable at the processors, the processors operable when executing the instructions to:
(a) communicate with a stream discovery agent (SDA) associated with an intermediate node to obtain stream-level information associated with an RTP flow of the signaling path, the stream-level information including a synchronous source (SSRC) value, a source IP address, a destination IP address, and a canonical name (CNAME) associated with the RTP flow;

(b) address an RTP management agent (RMA) associated with the intermediate node to obtain Management Information Base (MIB) information associated with a specified RTP stream in the RTP flow, the MIB information including statistics of the specified RTP stream and a list of all RTP streams that have recently contributed to the construction of the specified RTP stream;

(c) using the MIB information, trace back to one or more of the intermediate nodes in the signaling path to obtain additional statistics associated with the recently contributing RTP streams in the RTP flow; and (d) output image data that provides a directed graph of the RTP flow from the source endpoint to the destination endpoint, the directed graph including the statistics and the additional statistics for each of the intermediate nodes.

14. The apparatus of claim 13 wherein the image data comprises an RMA map that shows a complete directed graph of all RTP flows active in the network.

* * * * *